United States Patent
Gossner

[11] Patent Number: 6,109,422
[45] Date of Patent: Aug. 29, 2000

[54] CONVEYOR DEVICE

[75] Inventor: Anton Gossner, Augsburg, Germany

[73] Assignee: WF Logistik GmbH, Landsberg, Germany

[21] Appl. No.: 09/077,620

[22] PCT Filed: Dec. 2, 1996

[86] PCT No.: PCT/DE96/02330

§ 371 Date: Aug. 27, 1998

§ 102(e) Date: Aug. 27, 1998

[87] PCT Pub. No.: WO97/20759

PCT Pub. Date: Jun. 12, 1997

[30] Foreign Application Priority Data

Dec. 5, 1995 [DE] Germany .................. 295 19 284 U

[51] Int. Cl.$^7$ ................................... B65G 29/00
[52] U.S. Cl. ................................ 198/465.4; 198/687.1; 104/172.4
[58] Field of Search ................. 198/465.4, 687.1, 198/867.14; 104/172.4

[56] References Cited

U.S. PATENT DOCUMENTS

| | | | |
|---|---|---|---|
| 2,751,852 | 6/1956 | Joy | 104/172.4 |
| 3,896,921 | 7/1975 | Sund et al. | 198/867.14 |
| 4,058,064 | 11/1977 | Wilder et al. | 104/172.4 |
| 4,201,286 | 5/1980 | Meier | 198/465.4 |
| 5,056,438 | 10/1991 | Nozaki et al. | 198/465.4 |

FOREIGN PATENT DOCUMENTS

| | | |
|---|---|---|
| 0 337 891 | 10/1989 | European Pat. Off. . |
| 2 643 321 | 8/1990 | France . |
| 35 44 447 | 6/1987 | Germany . |
| 91 06 792 U | 11/1992 | Germany . |
| 92 06 550 U | 8/1993 | Germany . |
| 92 10 549 U | 1/1994 | Germany . |
| 94 02 990 U1 | 8/1995 | Germany . |
| 2 234 216 | 1/1991 | United Kingdom . |

Primary Examiner—Jospeh E. Valenza
Attorney, Agent, or Firm—Flynn, Thiel, Boutell & Tanis, P.C.

[57] ABSTRACT

A conveyor device for conveying suspended items inside a factory includes a conveyor capable of traveling on at least one runner on a track. The conveyor device includes a drive element for the conveyor. A drive catch arranged on the conveyor is adapted to be moved to a position of engagement with the drive element for entraining the conveyor. In order to modify this conveyor device in a structurally simple way so as to create greater scope for conveying tasks, in particular in automated operation, a separator device should be provided for effecting controlled movement of the drive catch from its position of engagement with the drive element at a predetermined point in the track.

22 Claims, 8 Drawing Sheets

CONVEYOR DEVICE

FIELD OF THE INVENTION

The present invention refers to a conveyor device for conveying suspended items inside a plant or factory.

BACKGROUND OF THE INVENTION

Such a conveyor device is known from DE 35 44 447 C2. The known conveyor device includes a conveyor means provided with an essentially V-shaped bow having a runner attached to each free end thereof; by means of these runners, the conveyor means can be suspended from a suitably adapted rail and roll along said rail. In the area of ascending paths in the track, a drive in the form of a chain is provided below the rail. For coupling with the drive means, a drive catch in the form of a pivotable rocker is arranged on the bow of the conveyor means at a point located opposite the chain. The rocker is provided with a plurality of teeth projecting in the direction of the chain, part of said teeth being implemented for engagement between the chain links and another part of said teeth being implemented such that they provide a planar support on the lower surface of the chain so that, under the influence of the conveying pressure, the rocker will force itself into engagement with the chain. When the rocker is in engagement with the chain, this position of engagement can only be released when the chain moves away from the rocker. Hence, it is not possible to release the conveyor means from the drive at an arbitrary position of the track. The known conveyor device is predominantly intended for manual operation, the chain drive being only used for supporting the conveying movement along ascending paths. For an automated conveyor device, for which it is necessary that the conveyor means can be released from the drive means at least at predetermined points in the track, said known conveyor means cannot be used.

For a more or less automated operation, it was therefore suggested e.g. in German Utility Model 91 06 792 that not the conveyor means but the chain should be provided with drive catches with the aid of which the conveyor means are driven even if said drive catches only strike against the conveyor means thus causing said conveyor means to be displaced along the track. The drive catch has a predetermined flexibility so that it can bend and move past the conveyor means when the resistance which the conveyor means offers to the drive means exceeds a predetermined value. The conveyor means can thus be released from the drive means in a simple manner e.g. by causing it to strike against an obstacle.

A further conveyor device provided with a chain drive for the conveyor means can be inferred from German Utility Model 92 06 550. In the case of this conveyor device, carriages are conveyed with the aid of a drive catch in the form of a flap secured to the chain. When the conveyor means is to be released from the drive means, the flap is pivoted out of engagement with the conveyor means.

It is true that an arrangement in which the drive catch is secured to the drive chain is very useful for conveyor devices with regard to a great variety of different cases of use; it permits e.g. a structural design of the conveyor device in the case of which the conveyor means are capable of accumulating without excessive loads being applied to the drive means when the conveyor means strike against an obstacle, and it permits the driving connection between the conveyor means and the drive means to be released at predetermined points of the track; but said arrangement also has serious disadvantages. The conveying distances between the conveyor means, for example, are predetermined by the distances between the drive catches on the drive chain. In addition, a comparatively large amount of space is required especially at the deflection points and the return leg of the chain drive, since also the drive catches must be deflected and returned. In addition, a specific type of drive chains must always be used so as to permit the drive catches to be pressed on and so as to guarantee the predetermined distance between the drive catches.

In comparison with this prior art, it is the object of the present invention to provide a conveyor device permitting a greater scope for the fulfillment of conveying tasks in a structurally simple way.

This object is achieved by the features of the invention.

On the basis of the structural design according to the present invention, the conveyor means can be released from the drive means independently of one another at predetermined points of the track rapidly and with a small amount of wear being caused, whereas the drive element continues to move as before. Notwithstanding this, the distance between the conveyor means can be varied, said distance being only limited by the width of the conveyor means in the conveying direction. The drive can be effected by any suitable chain or by means of drive elements of some other kind, the space required for the drive element being small and no additional drive means being necessary for components that are arranged on the drive element.

The conveying operation, in the case of which the drive catch engages the drive element, is the standard mode of operation, whereas the condition in which the operating means is released from the drive means will only occur when the locking engagement between the arresting member and the drive catch has been released by the separator device. In this way, a reliable conveying operation is guaranteed.

Due to the oblique surfaces extending transversely to the direction of movement of the drive catch, the drive catch will not be subjected to full load until it has assumed its correct position of engagement with the drive element, whereby the amount of wear will be reduced still further.

The spring-loaded condition of the arresting member and the positive locking engagement are solutions which are used for providing the locking engagement between the arresting member and the drive catch and which are specially preferred from the structural point of view.

Alternative structural embodiments of the drive catch can also be particularly efficient in practice.

One preferred structural embodiment of the conveyor means that is particularly suitable for conveyor means which are made of plastic material includes a structural design which is known e.g. from German-Utility Model 92 10 549.

In one particularly important embodiment, the individual components of the conveyor device can accumulate also outside of the separator device, i.e. the conveyor means, which are located one behind the other, are separated from the drive means when one conveyor means accumulates behind the next, so that excessive loads on the drive motor will be avoided.

BRIEF DESCRIPTION OF THE DRAWINGS

In the following, embodiments of the present invention will be explained in detail making reference to the drawings, in which.

DETAILED DESCRIPTION

FIGS. 1 to 6 disclose a first embodiment of a conveyor device 1 according to the present invention which is used for conveying suspended items inside a plant. The conveyor device 1 comprises a plurality of conveyor means 2 having each a vertical, elongate, rod-shaped carrier 3 from which a runner 4 projects on each side. The runners 4 are arranged below a cover 5. On the upper side of each carrier 3, a guide pin 6 arranged in the vertical centre line of the carrier 3 and guide pieces 7 projecting on both sides are provided, said guide pin 6 and guide pieces 7 guiding the conveyor means 2 e.g. over switches and junctions, this being described for conveyor means having a similar structural design e.g. in German Utility Model 92 10 549 which is herewith referred to. At the lower end of the carrier 3 facing away from the runners 4, a hook 8 is provided for attaching thereto the items to be conveyed.

The runners 4 are adapted to be rotated about a horizontal axis and they have grooved cirumferential surfaces so that they are adapted to roll along an upwardly curved rail 9 of a track 10.

A guide strip 11 extends along said track 10 below the rail 9 and alongside the conveyor means 2, a drive element in the form of a chain 12 being received in said guide strip 11; this chain 12 is moved along the track 10 by a motor in a manner which is not shown. The chain 12 is a commercially available roller chain and it is arranged in said guide strip 11 in such a way that its rollers extend essentially parallel to the longitudinal centre line of the conveyor means 2.

A drive catch in the form of a pin 14 is arranged on the carrier 3 of the conveyor means 2 between the runners 4 and the hook 8 in such a way that its longitudinal centre line extends at right angles to the longitudinal centre line of the conveyor means 2. The drive catch pin 14 is broader than the carrier 3 at this point so that it projects beyond the carrier 3 on both sides thereof with its drive catch tips 14a, the shape of said drive catch tips 14a being adapted to the spaces between the rollers of the chain 12.

Figures 2, 3:
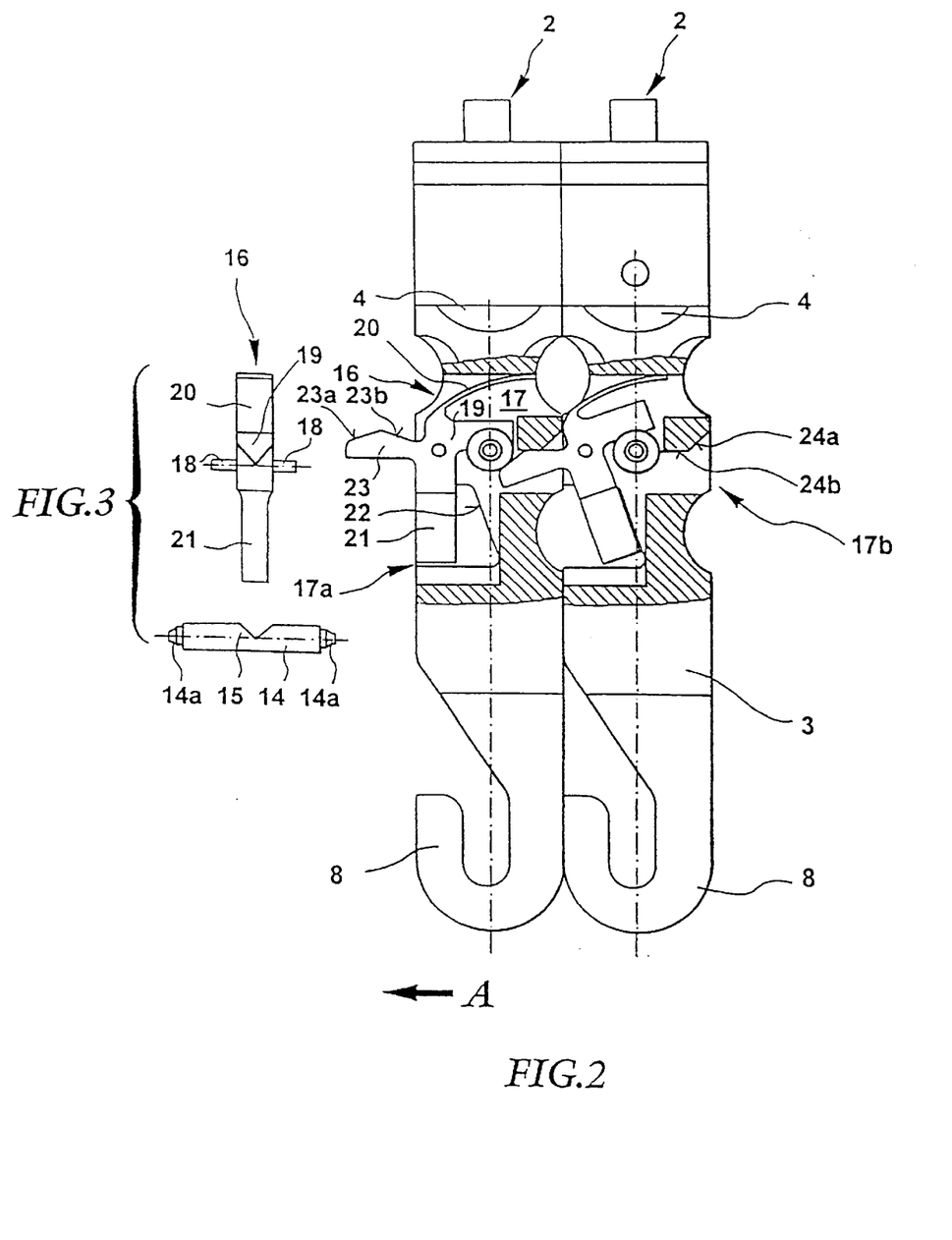
FIG. 2 shows two conveyor means of the conveyor device according to FIG. 1.
FIG. 3 shows the drive catch and the arresting member of the conveyor means according to FIG. 2.

As can be seen in FIG. 3, the drive catch pin 14 has a notch 15 which extends in the middle of the pin 14 from the circumference approximately down to the longitudinal centre line of said pin 14 and which has a substantially triangular cross-section.

As can especially be seen in FIGS. 2 and 3, the drive catch pin 14 is accommodated in a cavity 17 in the interior of the carrier 3 together with an arresting member 16. The arresting member 16 is implemented in the form of a pawl, and it is adapted to be pivoted about pivot pins 18 in the interior of the cavity 17, said pivot pins 18 extending parallel to the longitudinal centre line of the drive catch pin 14 and being located in the same horizontal plane as the longitudinal centre line of said pin 14. The arresting member 16 is provided with an extension arm 19 having a triangular cross-section corresponding to the notch 15 so that the pin 14 is secured against movement in the direction of its longitudinal axis when the extension arm 19 has fully entered the notch 15.

The arresting member 16 additionally includes a leaf spring 20 which abuts on a boundary surface of the cavity 17 and which is implemented such that it presses the extension arm 19 into the notch 15. At this position, the arresting member 16 locks the drive catch pin 14 against an axial displacement in the direction of the longitudinal axis of said drive catch pin 14 so that said drive catch pin 14 will remain at the engagement position in the chain shown in FIG. 1. The conveyor means 2 will be entrained by a movement of the chain 12.

On the side located opposite the spring 20, the arresting member 16 is provided with an actuating lever 21 extending downwards from the pivot pins 18. The actuating lever 21 is accessible from outside via an opening 17a in the cavity 17. In the interior of the cavity 17, a stop surface 22 is provided, said stop surface 22 restricting the maximum pivotal movement of the actuating lever 21.

The arresting member 16 is provided with an additional extension arm 23 which projects through the opening 17a beyond the cavity 17 and protrudes from the carrier 3, i.e. which advances in the conveying direction A when the conveyor means 2 carry out a conveying movement. The second extension arm 23 has on the upper side thereof two actuating surfaces 23a and 23b which extend at an angle relative to each other. On the side of the carrier 3 located opposite the opening 17a, a further opening 17b is provided, the upper side of said further opening 17b being defined by two stop surfaces 24a and 24b which extend at an angle relative to each other.

Figure 1:
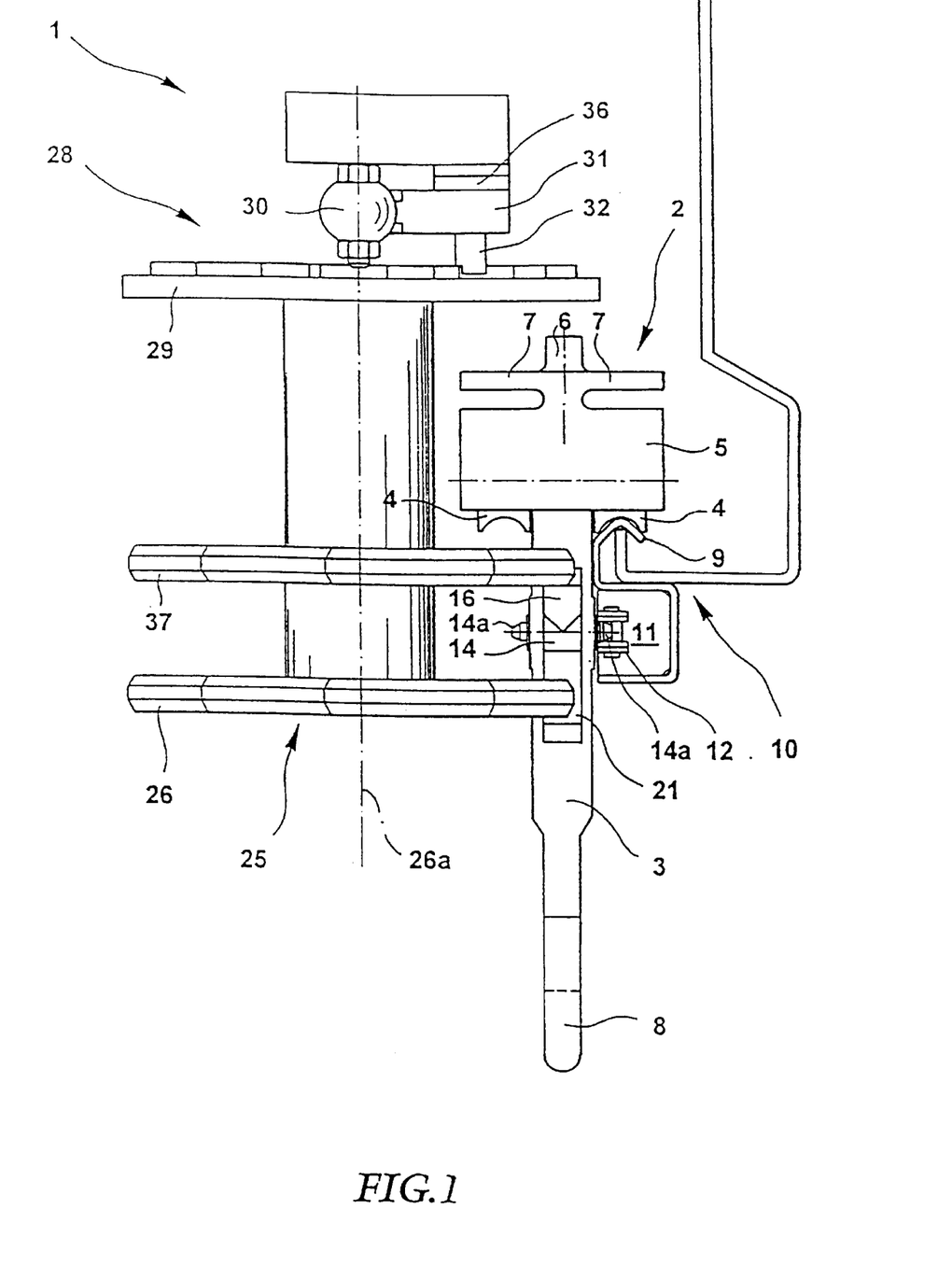
FIG. 1 shows a schematic representation of the most important parts of a first embodiment of a conveyor device according to the present invention.

As can be seen in FIG. 1, a separator device 25 is provided at a predetermined point adjacent the track 10, said separator device 25 being used for releasing the drive catch pin 14 from its position of engagement with the chain 12. The separator device 25 includes a wheel 26 which is freely rotatable about an axis of rotation 26a, said axis of rotation extending substantially parallel to the longitudinal centre line of the conveyor means 2 when said conveyor means 2 rolls along the rail 9 with the aid of its runner 4. The wheel 26 is located on the same level as the actuating lever 21 of the arresting member 16 of the conveyor means 2.

Figure 4:
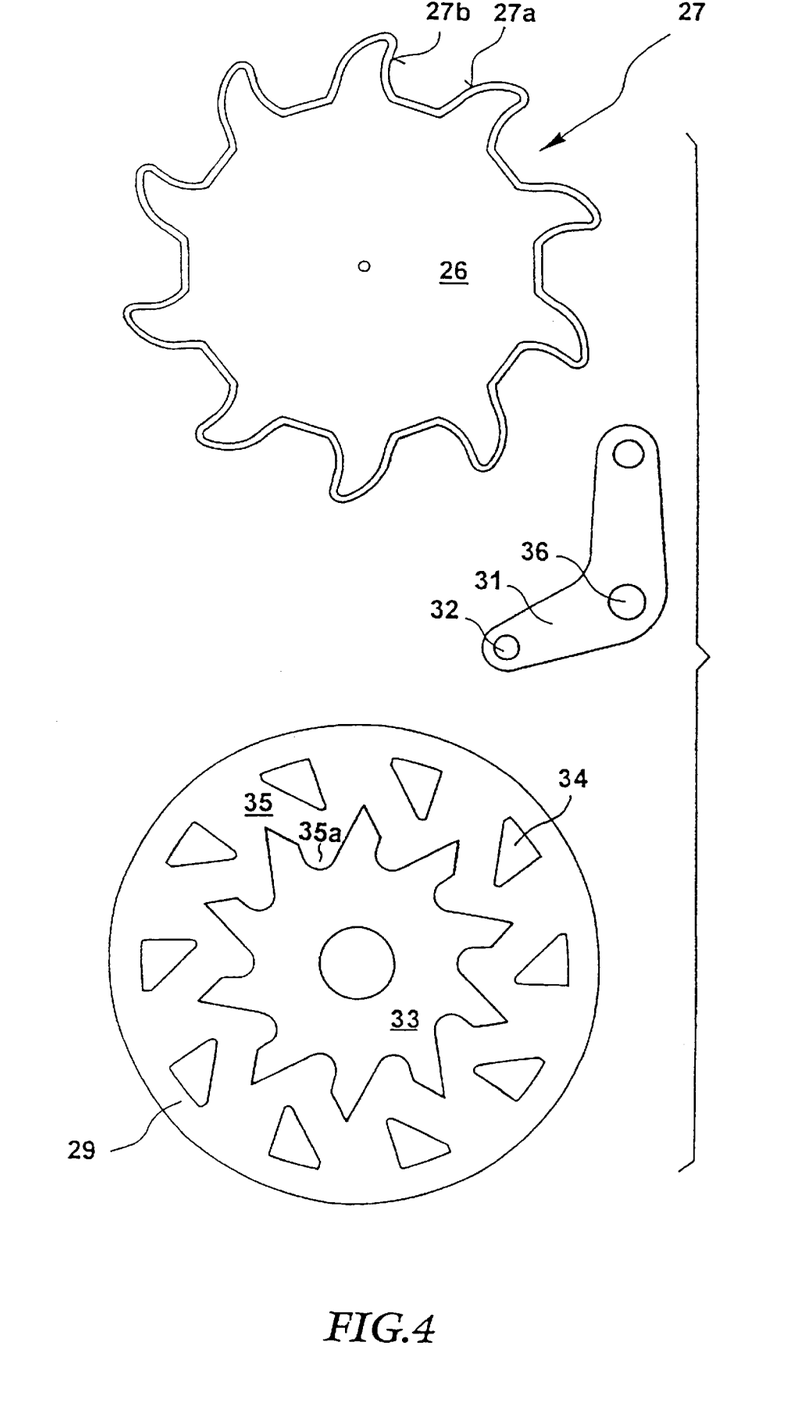
FIG. 4 shows the components of the separator device of the conveyor device according to FIG. 1.

As can especially be seen in FIG. 4, the wheel 26 has approximately the shape of a gear provided with a plurality of equally sized circumferential recesses 27 which are uniformly distributed over the cirumference of the wheel 26. Each circumferential recess is defined by a front stop surface 27a and a rear countersurface 27b, said surfaces extending approximately in the radial direction. The depth of each recess 27 in the radial direction is dimensioned such that, in the area of the actuating lever 21, at least half the width of the conveyor means 2 transversely to the conveying direction can be received in said recess 27. The distance between the stop surface 27a and the countersurface 27b of each recess 27 is smaller than the length of the conveyor means 2 in the conveying direction A and it is dimensioned such that the actuating lever 21 must be pressed into the cavity 17 up to the stop surface 22 or rather up to a point located close to said stop surface 22 before the conveyor means 2 fits into the recess 27.

It follows that, when a conveyor means 2 rolls on the rail 9 into the area of the wheel 26, the actuating lever 21 of the arresting member 16 strikes against one of the stop surfaces 27a projecting permanently into the path of said conveyor means 2 on the rail 9. Due to the conveying pressure exerted by the chain 12, the conveyor means 2 will be forced into the recess 27 in question, whereby the arresting member 16 will be pivoted via the actuating lever 21 and the extension arm 19 will move out of the notch 15 of the drive catch pin 14 at least to such an extent that, under the influence of the conveying pressure, said drive catch pin 14 can move in the axial direction at least so far that it slips out of its position of engagement with the chain 12. The impetus of the conveyor means 2 is, however, sufficient to make the wheel turn freely so that, immediately afterwards, the conveyor means leaves the area of the recess 27, whereby the arresting member 16 can return to its locking position under the influence of the leaf spring 20; at this locking position, the extension arm 19 has fully entered the notch 15 so that the drive catch pin 14 is again locked at its engaged position.

For permanently releasing the conveyor means 2 from the drive means, the separator device 25 comprises a positioning means 28. The positioning means 28 comprises a cam wheel 29, which is adapted to be rotated about the same axis of rotation 26a as the wheel 26 and which is connected to said wheel 26 so as to be secured against rotation relative thereto, a positioning cylinder 30 and a bent lever 31 with a cam follower pin 32. On the side facing upwards, the cam wheel 29 has a cam relief comprising a central, substantially star-shaped cam 33 and a plurality of individual cams 34 surrounding said central cam and delimiting guide grooves 35 for the cam follower pin 32, one guide groove 35 being provided for each of the recesses 27. The guide grooves 35 extend substantially V-shaped from the outer circumference of the cam wheel 29 at an oblique angle radially inwards up to and into a cam pin reception means 35a and from said cam pin reception means 35a they extend again at an oblique angle radially outwards. The two-armed bent lever 31 has on one arm thereof the cam follower pin 32, the other arm being articulated on the positioning cylinder 30. At the point of intersection of said arms, the bent lever 31 is rotatably supported via a pintle 36.

Figure 5:
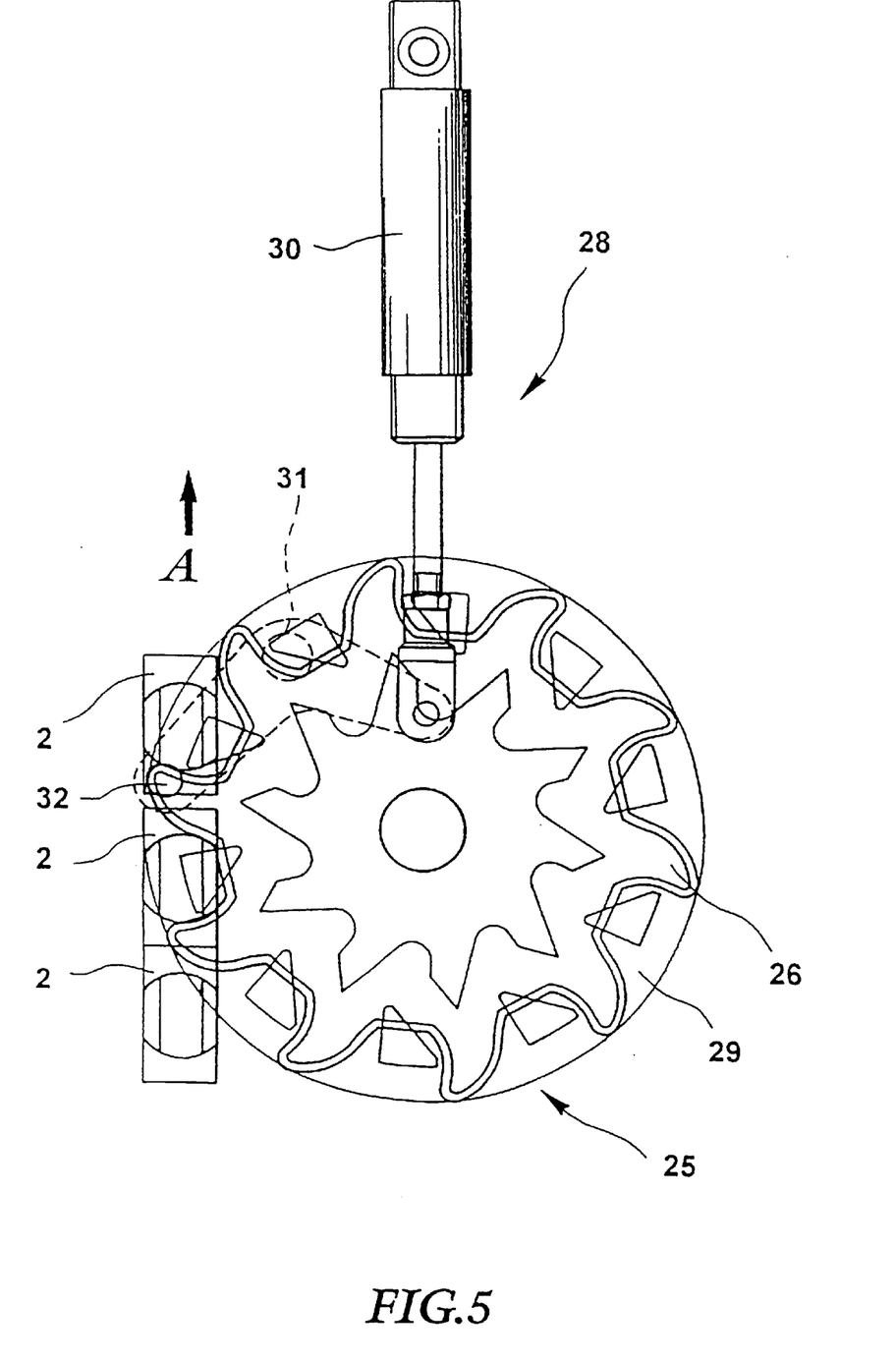
FIG. 5 shows a top view of the separator device of FIG. 1 at a first position.
Figure 6:
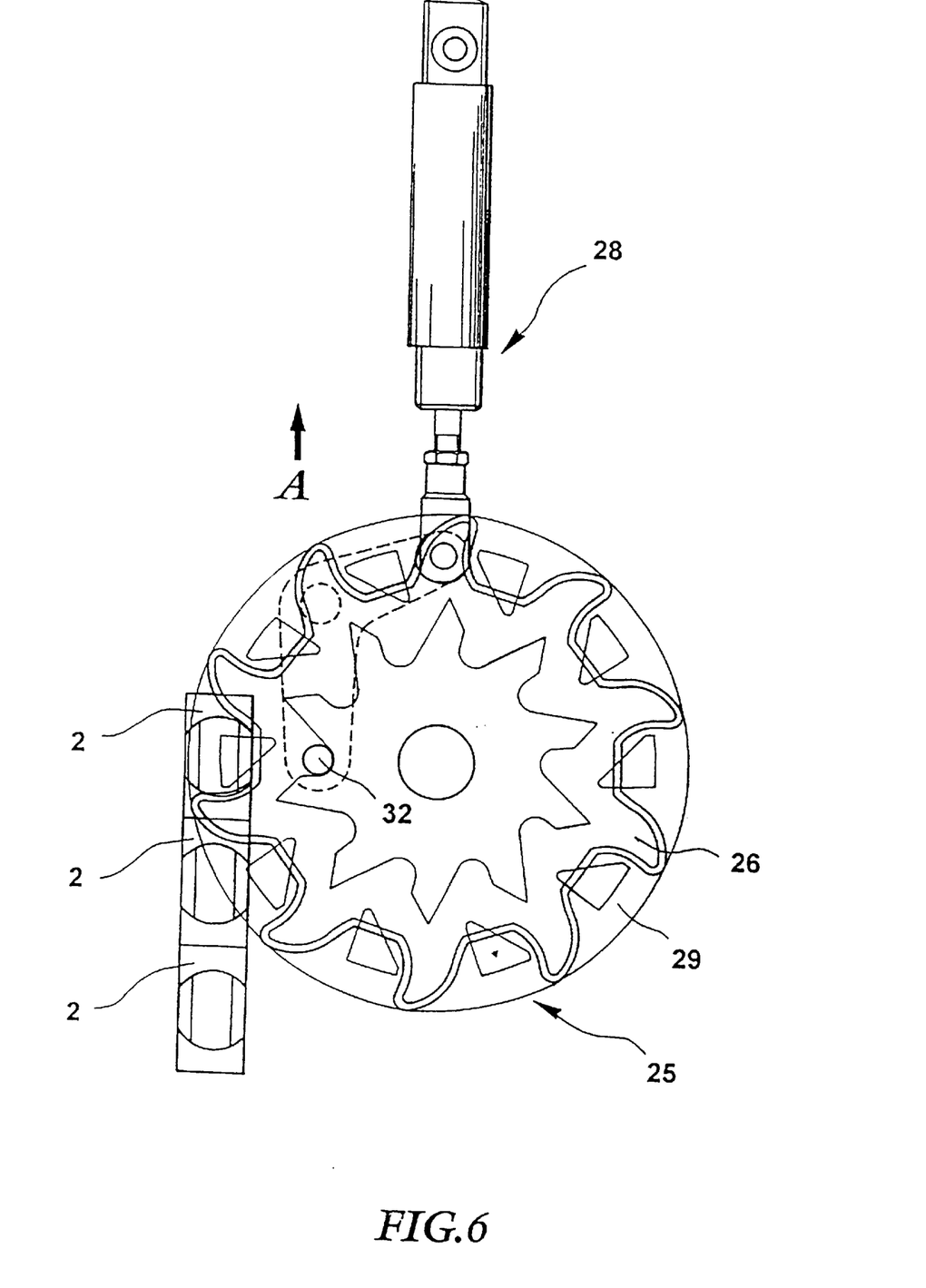
FIG. 6 shows a representation, similar to that shown in FIG. 5, of the separator device at a second position.

FIGS. 5 and 6 show different operating positions of the positioning means 28, the individual components being shown in the drawing one on top of the other so as to show how the wheel 26 and the positioning means 28 of the separator device 25 are arranged relative to one another and relative to the conveyor means 2.

FIG. 5 shows the position of the positioning means 28 when, as has been described hereinbefore, the conveyor means 2 are intended to run through unhindered and without being permanently separated from the drive means. For this purpose, the positioning cylinder 30 is actuated such that the bent lever 31 pivots to a position at which the cam follower pin 32 is radially pivoted outwards away from the circle of rotation of all cams 33, 34 of the cam wheel 29. The cam wheel 29 can then rotate freely together with the wheel 26 so that the conveyor means 2 can run through unhindered, as has been shown in FIG. 5.

If it is, however, intended to stop the conveyor means 2 and to separate it from the drive effected by means of the chain 12, the cam follower pin 32 of the bent lever 31 is pivoted radially inwards via the positioning cylinder 30. Due to the large number of guide grooves 35 in the cam wheel 29 and due to the shape of said guide grooves, it is guaranteed that the cam follower pin 32 can always enter one of said guide grooves 35 irrespectively of the position to which the cam wheel 29 has been rotated together with the wheel 26 by preceding, freely passing conveyor means 2. Once the cam follower pin 32 has entered a guide groove 35, it will inevitably and reliably be guided, due to the shape of said groove, up to an into the cam seat 35a at the radially innermost position of said guide groove 35. When the cam follower pin 32 is located at this position, rotation of the wheel 26 is blocked, as can be seen in FIG. 6. This has the effect that the conveyor means 2 which is currently located in the recess 27 of the wheel 26 projecting into the conveying path is separated from the drive means in the way described hereinbefore and stopped so that subsequent conveyor means 2 can accumulate behind said first-mentioned conveyor means 2.

When subsequent conveyor means 2 are accumulating behind the conveyor means 2 held in the recess 27 of the separator device 25, also the conveyor means accumulating are separated from the drive means. As can be seen in FIG. 2, this is done with the aid of a further extended arm 23 which enters the opening 17b of the carrier 3 of the preceding, retained conveyor means 2, said opening 17b being the rear opening in the conveying direction A. In the course of this process, the actuating surface 23a first comes into contact with the stop surface 24a, whereby the extended arm 23 is pressed downwards and the arresting member 16 and its extended arm 19 are pivoted away from their locking position in the notch 15 of the drive catch pin 14. This unlocking, pivoted position of the arresting member 16 is then fixed in that the second actuating surface 23b strikes against the second stop surface 24b, said surfaces being brought into engagement with one another as soon as the carrier of the subsequent conveyor means strikes against the carrier of the preceding conveyor means. This position is given in the case of the conveyor means shown in FIG. 2 on the right hand side. The drive catch pins 14 of each subsequent, oncoming conveyor means are released from their position of engagement with the chain 12 in the same way so that the conveyor means will be stopped in a row, whereas the chain will pass through.

The accumulated row of conveyor means 2 can then be further dealt with as desired. One possibility is, for example, to reengage each conveyor means with the drive means separately and in predetermined spaced relationship with the preceding conveyor means by clockwise pivoting of the cam follower pin 32 to its radially outermost position so as to enable the wheel 26 and the cam wheel 29 to rotate freely. It is also possible to separate the conveyor means, one at a time, from the accumulated row at predetermined time intervals so as to lead them one after the other onto individual tracks via a switch which is not shown; the time interval between two released conveyor means can then be adapted precisely to the switching time of the switches. Instead of individual conveyor means, it is also possible to release groups of conveyor means from the accumulated row.

In order to prevent the carriers 3, which are suspended by means of only one runner 4, from swinging to and fro when they enter the circumferential recess 27 or when they leave said recess 27, a further wheel 37, which is freely rotatable in any case, can be provided above and in spaced relationship with the wheel 26; as for the rest, said wheel 37 is constructed analogously to the wheel 26 and it is also provided with circumferential recesses 27; said wheel 37, however, acts on the conveyor means 2 outside of the arresting member 16, but, preferably, also in a recess between the runners 4 and the hook 8.

FIGS. 7 to 10 show a further embodiment of a conveyor device 100 according to the present invention, in said figures, components which are identical or comparable to those of the conveyor device 1 of the preceding figures are designated by the same reference numerals which have been augmented by 100. The device 100 again comprises a plurality of conveyor means 102 including a carrier 103 provided with runners 104, a cover 105, a guide pin 106, a guide piece 107 and a hook 108 for attaching thereto the items to be conveyed. The runners 104 are implemented such that they are adapted to roll along a rail 109 of a track 110. A guide strip 111 for a driving chain 112, which can again be implemented as a roller chain, extends along said track 110.

The carrier 103 of the conveyor means 102 includes a drive catch 114 in the form of a wheel which is provided with circumferential teeth (FIG. 9) and which is supported so as to be rotatable on a pin 140, extending in the interior of the carrier 103, about the vertical longitudinal centre line of said carrier 103 in such a way that its teeth can come into driving engagement with the chain 12.

Below the drive catch gear 114, an arresting member 116 is arranged on the same pin 140 in an axially displaceable manner. The arresting member 116 is forced into locking engagement with the drive catch gear 114 by means of a helical spring 120 so that the drive catch gear 114 will normally be secured against rotation and held at its position of engagement with the chain 112. Also the helical spring 120 is arranged around the pin 140 and accommodated, together with the arresting member 116, in a cavity 117 in the interior of the carrier 103.

Figure 8:
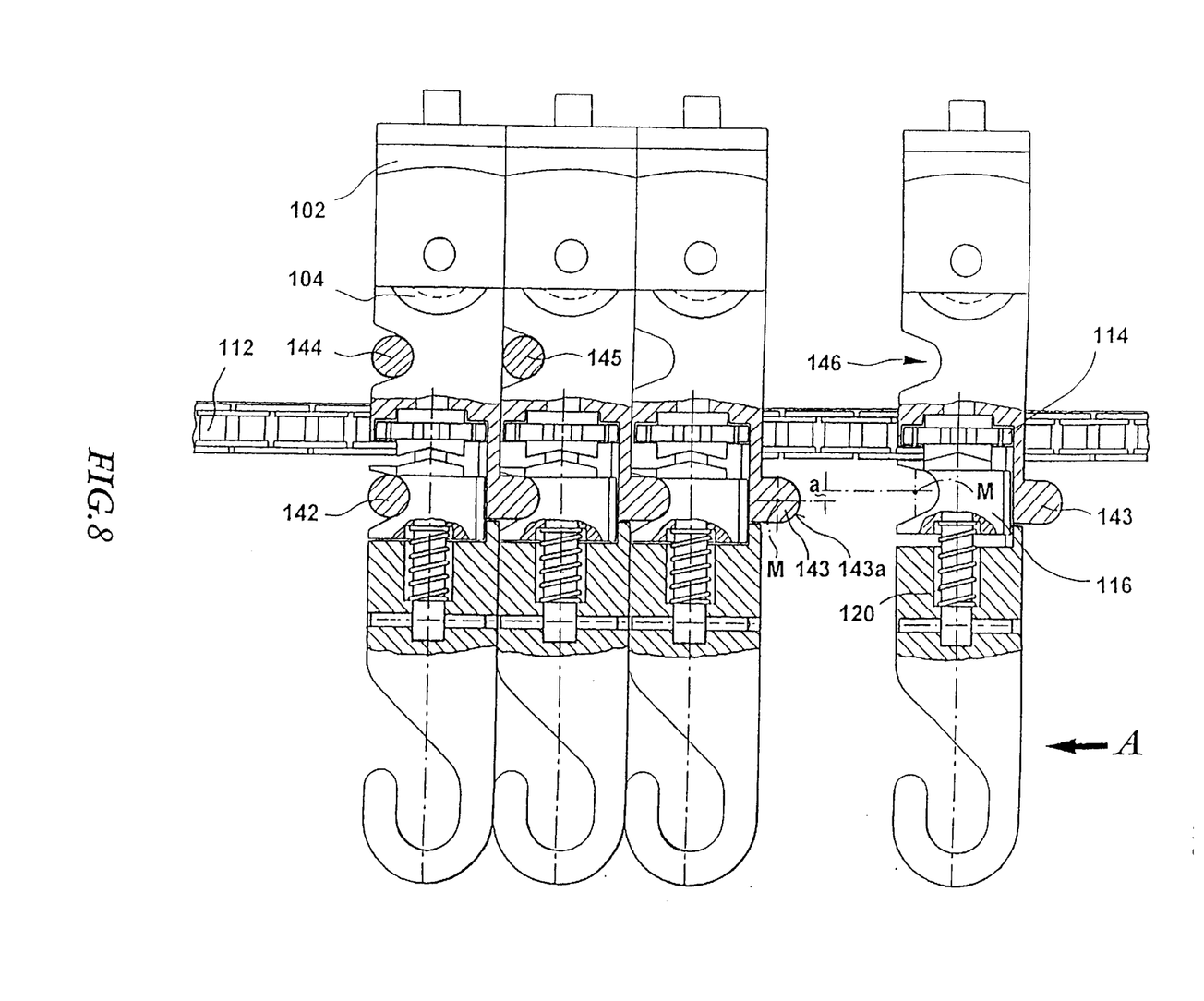
FIG. 8 shows a plurality of conveyor means for the conveyor device according to FIG. 7.
Figure 9:
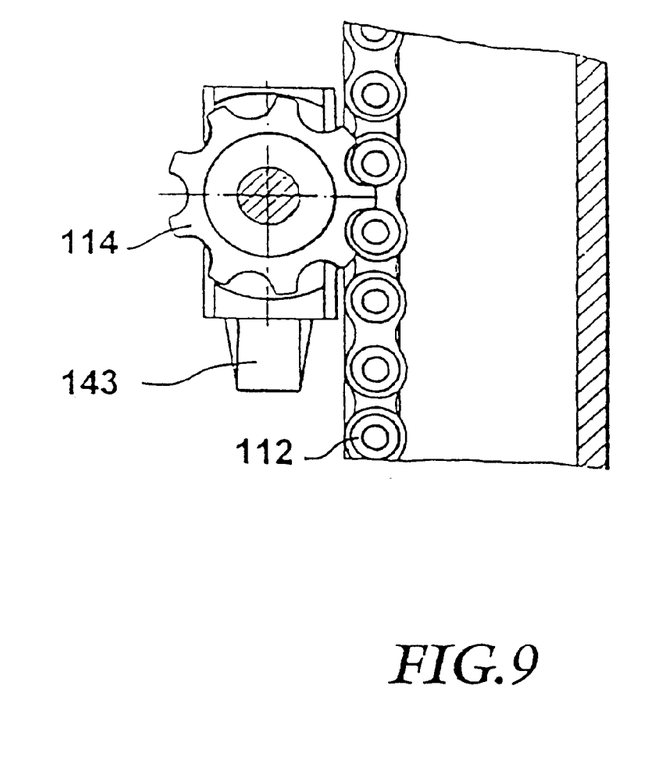
FIG. 9 shows section IX—IX of FIG. 1.
Figure 10:
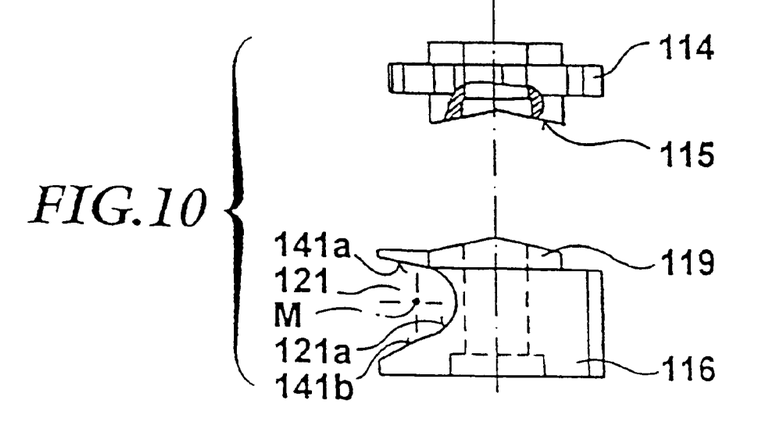
FIG. 10 shows a side view of the drive catch and of the arresting member of the conveyor means according to FIG. 7.

As can especially be seen in FIGS. 8 and 10, the locking engagement between the arresting member 116 and the drive catch gear 114 is effected by means of a prismatic indentation 115 arranged on the drive catch gear 114 and a complementary prismatic projection 119 arranged on the arresting member 116, said indentation 115 and said projection 119 being not rotationally symmetric so as to secure the drive catch gear 114 effectively against rotation relative to the arresting member. The arresting member 116 includes an actuating recess 121 on the side constituting the leading side in the conveying direction, said actuating recess 121 having an approximately semicylindrical actuating surface 121a which is curved about a centre line M. The actuating surface can also be composed of oblique surfaces. Towards the outside, the actuating surface 121a is followed by upper and lower guide surfaces 141a and 141b extending at an oblique angle outwards and upwards and outwards and downwards, respectively, and enlarging the opening width of the actuating recess 121.

Figure 7:
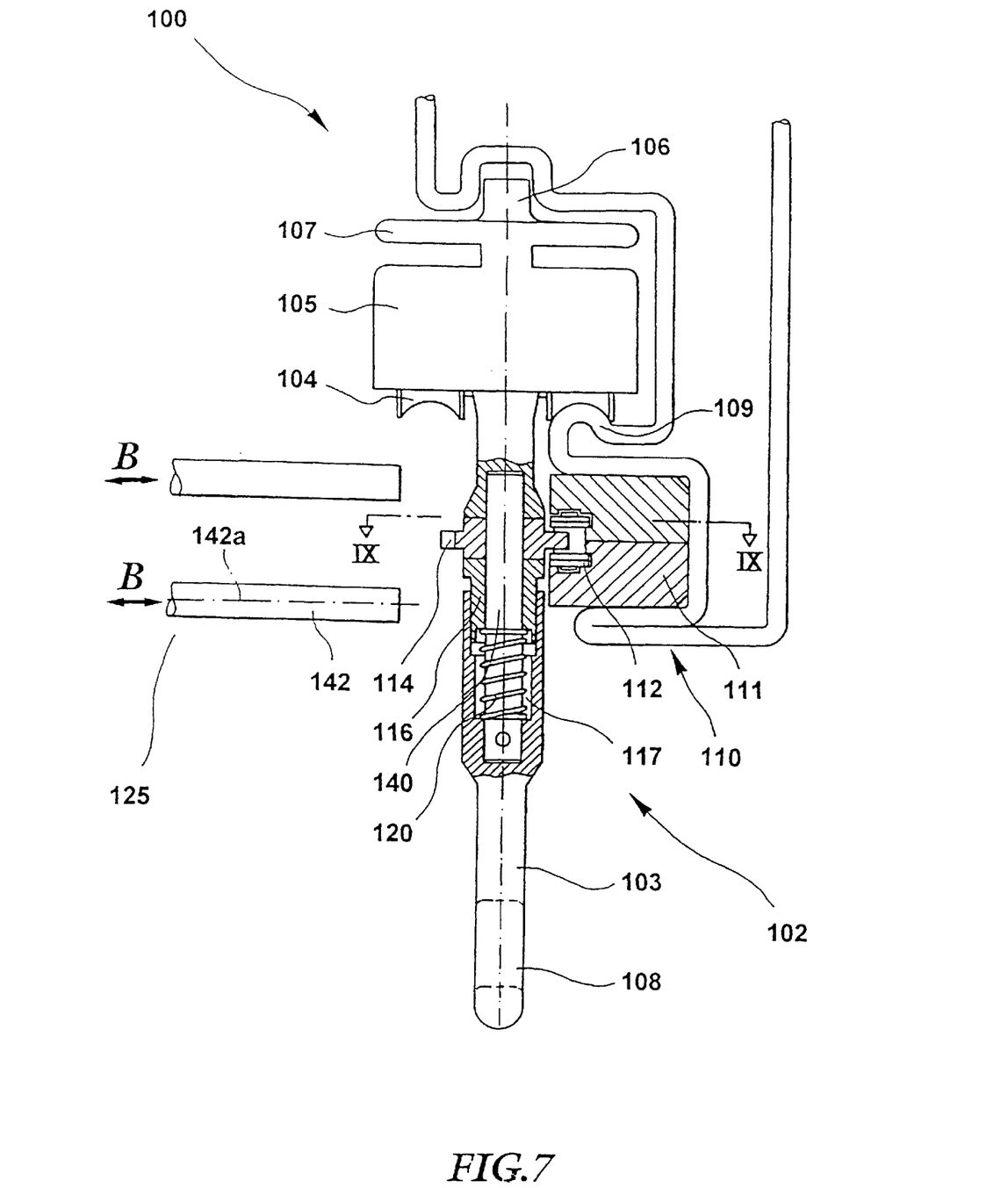
FIG. 7 shows a schematic representation of a second embodiment of a conveyor device according to the present invention.

As can be seen in FIG. 7, the conveyor device 100 includes a separator device 125 including a pin 142 which is adapted to be linearly displaced in the direction of its longitudinal axis in the direction of arrow B. The displacement of said pin can be effected with the aid of any suitable controllable means, said means being not shown. The pin 142 has a circular cross-section having a radius that corresponds essentially to the radius of the actuating surface 121a provided on the arresting member 116. Its longitudinal centre line 142a is, however, arranged in such a way that it extends below the centre line M of the cylindrical actuating surface 121a in vertically spaced relationship therewith, the distance between said centre lines corresponding to a predetermined distance a.

Distance a is, however, not large enough to permit a conveyor means 102 to strike against the pin 142 outside of the guide surfaces 141a, 141b of the actuating recess 121, when said pin has been moved into the path of the conveyor means 102 on the track 110. On the other hand, said distance a is large enough that, under the influence of the conveying pressure, the arresting member 116, which endeavours to receive the pin 142 completely in the correspondingly curved actuating surface 121a, is pressed downwards, under compression of the spring 120, to such an extent that the locking engagement of the prismatic projection 119 in the complementary indentation 115 on the drive catch gear 114 is released, whereupon said drive catch gear 114 can rotate freely about the pin 140. This has the effect that the moving chain 112 will only cause the drive catch gear 114 to rotate, whereas the conveyor means 102 stands still.

As in the case of the conveyor device 1 according to the first embodiment, also the conveyor device 100 is implemented such that the conveyor means can accumulate. For this purpose, each conveyor means 102 includes a projection 143 with a semicylindrical stop surface 143a, which is curved about its centre line M with the same radius as the actuating lever 121a on the arresting member 116, said projection 143 being provided on the side of the carrier 103 constituting the rear side in the conveying direction A, i.e. the side located opposite the actuating surface 121a. In addition, the centre line M of the stop surface 143a extends below the centre line M of the actuating surface 121a, the distance a between said centre lines M corresponding to the distance a which has been described hereinbefore in connection with the centre line 142a of the pin 142. It follows that, when a subsequent conveyor means 102 accumulates behind a conveyor means which has been stopped by the pin 142 and separated from the drive means, the actuating recess 121 of said subsequent conveyor means will be put over the stop surface 143a of the front conveyor means in the manner which has already been described for the pin 142. Also this has the effect that, against the effect produced by the helical spring 120, the arresting member 116 is pulled downwards and out of its locking engagement with the drive catch gear 114. The conveyor means will accumulate.

In addition to the pin 142 of the separator device 125, a further pin 144 is provided, which acts on the carrier 103 at a point located above the pin 142 but still below the runners 104 and which is moved simultaneously with the pin 142. This additional pin 144 serves to reduce still further the swinging movement of the conveyor means 102 which runs only on one runner 104. At a distance corresponding to the width of the conveyor means 102 in the conveying direction A, a third pin 145 can additionally be provided, said third pin 145 being adapted to be displaced independently of the pins 142 and 144 but in the same direction B. The third pin 145 remains in engagement with a subsequent conveyor means e.g. until it is sure that the projection 143 of the preceding conveyor means 102 has been released from the arresting member so that the conveyor means can reliably be separated from one another. It will be expedient to provide each conveyor means 102 with a recess 146 into which the second as well as the third pin 144, 145 can be sunk completely.

As modifications of the embodiments described and shown hereinbefore, the details described on the basis of the individual drawings can easily be interchanged. The arresting member and the separator device according to FIG. 1 can, for example, also be used in combination with a drive catch gear and the drive catch pin can be used in the device according to FIG. 7. The locking engagement can also be effected by means of friction alone. Instead of the roller chain, any other type of conveying chain, which should be provided with a suitably adapted drive catch in an expedient manner, can be used for the purpose of driving. Instead of the conveyor means described, also other forms of conveyor means known in the prior art can be equipped with the drive catches and the separator device, The cam wheel and the wheel provided with circumferential recesses of the device according to FIG. 1 can be combined so as to form a unit. Instead of this wheel, it is also possible to use a cross or the like, which is provided with recesses.

What is claimed is:

1. A conveyor device comprising a conveyor means capable of traveling on at least one runner on a track, a drive element for the conveyor means, a drive catch arranged on said conveyor means and adapted to be moved to a position of engagement with the drive element for entraining the conveyor means, and a separator device for effecting controlled movement of the drive catch from its position of engagement with the drive element at a predetermined point in the track, wherein an arresting member is provided for locking the drive catch at its position of engagement, said arresting member being adapted to be moved by the separator device for releasing the locking engagement, and said drive catch being adapted to be moved by the conveying pressure exerted by the drive element when the locking engagement has been released.

2. A conveyor device according to claim 1, wherein in the condition of locking engagement, the drive catch and the arresting member are adapted to be brought into engagement with one another via an oblique surface extending transversely to the direction of movement of the drive catch.

3. A conveyor device according to claim 1, wherein the arresting member is pressed by a spring into the locking engagement with the drive catch.

4. A conveyor device according to claim 1, wherein a recess and a complementary projection are provided between the drive catch and the arresting member so as to effect a positive locking engagement.

5. A conveyor device according to claim 1, wherein the drive catch includes an axially displaceable pin for engagement with the drive element implemented as a chain.

6. A conveyor device according to claim 1, wherein the drive catch includes a rotatable wheel, the circumference of said wheel being provided with teeth engaging the drive element which is implemented as a chain.

7. A conveyor device according to claim 3, wherein the arresting member includes a pivotable pawl which is spring-loaded by the spring.

8. A conveyor device according to claim 3, wherein the arresting member is adapted to be linearly displaced by the spring.

9. A conveyor device according to claim 1, wherein the separator device includes a stop means which projects into the path of the arresting member on the track, and by means of the conveying pressure which the drive element applies to the conveyor means, the arresting member is capable of pressing against said stop means and releasing the locking engagement with the drive catch.

10. A conveyor device according to claim 9, wherein the separator device includes a rotatably supported carrier provided with a stop surface, and a positioning means is provided for locking said carrier and securing said carrier against rotation thereof.

11. A conveyor device according to claim 10, wherein the carrier comprises a freely rotatable wheel provided with a plurality of circumferential recesses, each circumferential recess having a stop surface and a countersurface which are arranged at a distance from one another that corresponds to the width of the conveyor means in an unlocked condition of the arresting member.

12. A conveyor device according to claim 11, wherein the positioning means includes cams and cam followers.

13. A conveyor device according to claim 11, wherein the positioning means includes a cam relief connected to the wheel and secured against rotation relative thereto, and an arrestable cam follower.

14. A conveyor device according to claim 1, wherein the separator device includes a stop linearly movable between a position at which said stop projects into the path of the arresting member and a position at which said stop retracts from the path.

15. A conveyor device according to claim 14, wherein the stop cooperates with an actuating surface on the arresting member, said stop and said actuating surface having corresponding curvatures or oblique-surface arrangements curved around or arranged around a respective centre line, the centre line of the stop being displaced relative to the centre line of the actuating surface by a distance in the direction of compression of a spring of the arresting member.

16. A conveyor device according to claim 14, wherein the stop comprises a pin having a circular cross-section.

17. A conveyor device according to claim 16, wherein the pin comprises one of two pins which are arranged one after the other at a distance corresponding to the width of the conveyor means in the conveying direction.

18. A conveyor device according to claim 1, wherein the conveyor means includes a carrier suspended from the track by at least one runner, the drive catch and the arresting member being arranged on said carrier.

19. A conveyor device according to claim 1, wherein the drive catch is positioned below the runner for engagement with the drive element, the drive element comprising a chain moving alongside the conveyor means.

20. A conveyor device according to claim 18, wherein the arresting member is accommodated in the interior of the carrier and is accessible from outside of the carrier.

21. A conveyor device according to claim 1, including an additional separator device arranged on the conveyor means for effecting a controlled movement of the drive catch of a neighbouring conveyor means from its position of engagement with the drive element under the influence of the conveying pressure pressing the conveyor means onto one another.

22. A conveyor device according to claim 21, wherein the additional separator device includes a stop surface arranged on the conveyor means and used for an arresting member of the neighbouring conveyor means.

* * * * *